Sept. 15, 1936.   J. R. FERGUSON   2,054,123
MOTOR VEHICLE
Filed Dec. 29, 1934
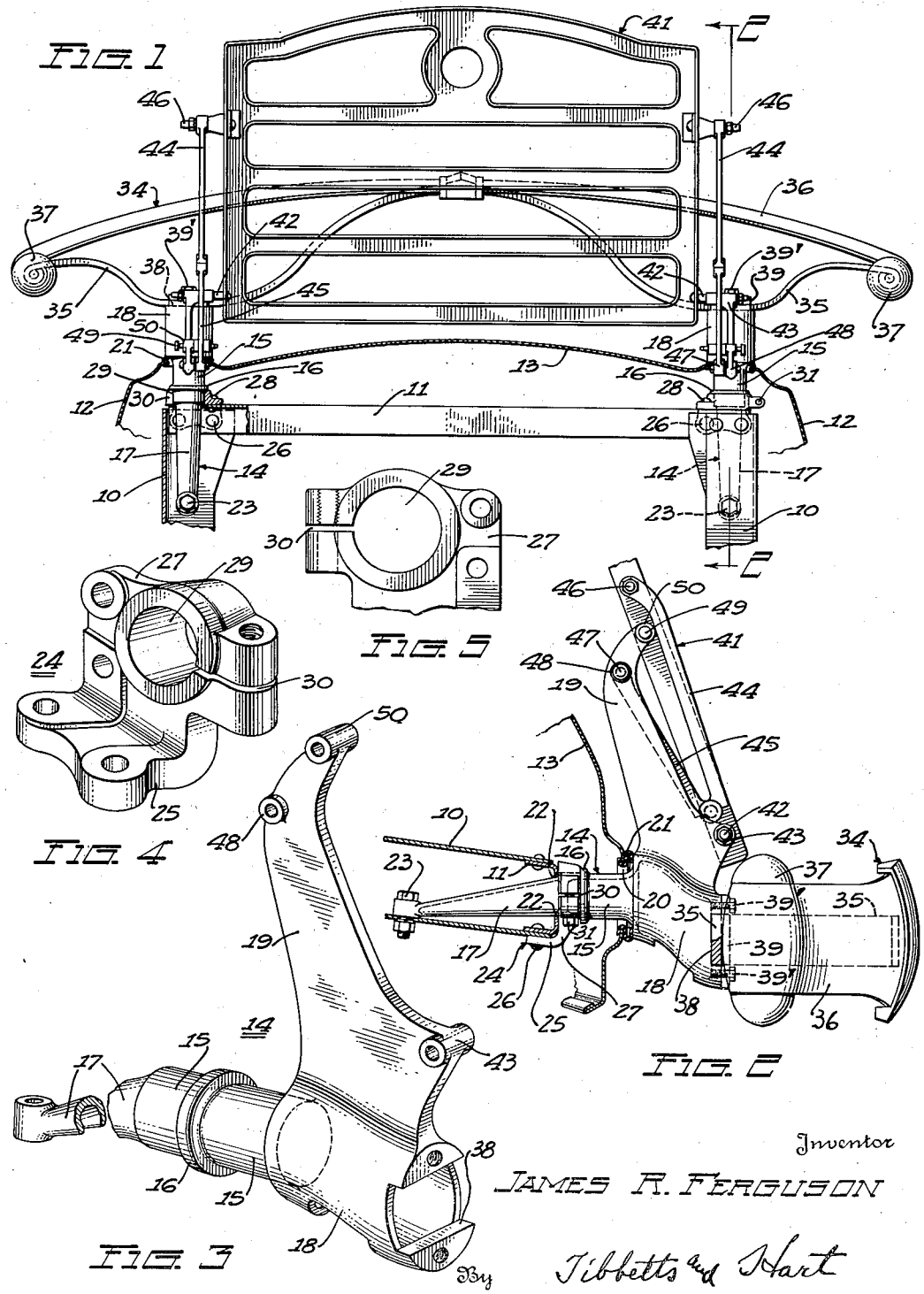
Inventor
JAMES R. FERGUSON
By Tibbetts and Hart
Attorneys Patented Sept. 15, 1936

2,054,123

UNITED STATES PATENT OFFICE 2,054,123

MOTOR VEHICLE

James R. Ferguson, Royal Oak, Mich., assignor to Packard Motor Car Company, Detroit, Mich., a corporation of Michigan Application December 29, 1934, Serial No. 759,715

5 Claims. (Cl. 293—55)

This invention relates to motor vehicle accessory supporting means and more particularly to supporting means for bumpers and trunk racks.

An object of the invention is to provide accessory supporting means which can be readily affixed to or removed from a motor vehicle.

Another object of the invention is to provide accessory supporting means, of the character above specified, which can be bodily moved through a portion of the body panel of a motor vehicle and readily attached to or detached from the vehicle main frame.

A further object of the invention is to provide supporting members for carrying both a bumper and a trunk rack on a motor vehicle frame.

Still another object of the invention resides in the provision of accessory supporting members which are formed and associated with a motor vehicle main frame in a manner to adequately sustain a given weight and to distribute the forces transmitted thereby over a large area on the frame.

Other objects of the invention will appear from the following description taken in connection with the drawing, which forms a part of this specification, and in which:

Fig. 1 is a horizontal sectional view of the rear end portion of a motor vehicle illustrating the invention;

Fig. 2 is a sectional view of the same taken on line 2—2 of Fig. 1;

Fig. 3 is a perspective view of one of the supporting members;

Fig. 4 is a perspective view of one of the member supporting brackets;

Fig. 5 is a fragmentary end elevational view of one of the supporting brackets.

Referring now to the drawing by characters of reference, 10 represents channel side sills and 11 the transverse rear channel sill of a motor vehicle main frame. Side panels 12 and a rear panel 13, of a conventional body structure, extend downwardly below and around the rear end of the main frame.

Accessory supporting means is associated with the rear end of the main frame and such means can be utilized to carry either a bumper, a trunk rack, or both. A pair of similar supporting members, indicated generally at 14, are associated one with each side of the rear end of the vehicle main frame. Each member has a cylindrical shank portion 15 provided with a radially extending circular flange 16 intermediate its ends, and projecting forwardly from the shank is a supporting and anchoring extension or leg 17. At the rear end of each shank is a hollow body portion 18 from which an arm 19 extends upwardly. Such body is of larger diameter than the shank and is finished at its rear end to support the bumper indicated generally at 34. The arm 19 of each supporting member provides a carrier for the trunk rack indicated generally at 41. These supporting members are preferably each formed as an integral structure in the form of a casting or forging.

The supporting members are attached to the main frame in a manner such that they can be readily moved bodily into and out of position and so that forces transmitted thereby to the main frame are spread over a relatively large area. The shank and leg portions of the supporting members can be moved bodily in a direction longitudinally of the vehicle through openings 20, formed in the body rear panel, and suitable grommets 21 are associated with the panel to engage around the front faces of the body portions of the supporting members. The transverse frame sill 11 is formed with openings 22 aligning with the body panel openings in order to receive the legs of the supporting members which project forwardly a relatively long distance within the side sills 10.

The forward ends of the extensions 17 bear against and are secured to the side sills by means of bolts 23. Supporting the members 14 rearwardly of the main frame are angular brackets 24. The lower portion 25 of each bracket extends beneath the rear end of one of the side sills and is riveted thereto, as indicated at 26, while the upper bearing portion 27 of each bracket extends adjacent the transverse sill and is riveted thereto as indicated at 28. The upper portions of such brackets are each formed with an opening 29, and there is a slit 30 extending from each opening to one side of its bracket structure in order that the bifurcated ends can be drawn together by bolts 31 around the rear shank portion 15 of the associated supporting member. The bearing portions of the brackets through which the shanks extend serve as supports for the members 14 and also as thrust members between the flanges 16 and the rear sill of the vehicle main frame. As the brackets 24 and the bolts 23 form the connections between the frame and the supporting member 14, it will be seen that the forces transmitted to the main frame will be well distributed so that the main frame will not become distorted due to localized stresses.

It will be seen that the supporting members can be moved bodily in a direction longitudinally of the vehicle for assembly with or removal from the main frame when the bolts 31 are loosened and the bolts 23 are removed from the legs. It will be seen that such bolts are readily accessible. Because of the manner in which the supporting members are attached to the main frame, a rugged support is provided and localized stress of the main frame is eliminated.

Associated with the rear faces of the body portions of the supporting members is a conventional form of bumper consisting of a back bar 35 and an impact bar 36 connected at their ends by bolts 37. The end faces of the body portion of the supporting members are each formed with a transversely extending recess 38 into which the bumper back bar is fitted for attachment. Locking plates 39 overlie the portions of the back bar lying in the recesses and the rear ends of the body portions of the supporting members and are secured to the body portions by means of bolts 39'. By removing these bolts 39' the bumper can be readily moved bodily to or from assembled relation with the supporting members.

The arms 19 on the supporting members are utilized to support the trunk rack 41. Pivot means 42 carried by the sides of the trunk rack are associated with bosses 43 on the arms and serve to anchor the trunk rack with the main frame. A pair of arms 44 and 45 are pivoted together adjacent each side of the rack and serve to support the free end of the trunk rack when in a horizontal position as shown in Fig. 1. The arms 44 are carried on pivots 46 fixed to the sides of the rack, and the arms 45 are carried on pivots 47 which extend through bosses 48 on the supporting arms. A rod 49 extends through bosses 50 on the arms 19 to provide a stop member for limiting movement of the rack toward the rear body panel, as shown in Fig. 2.

It will be seen that the two supporting members 14 can be moved bodily through openings in the rear body panel and the rear main frame sill and readily attached to or detached from the main frame without interference. The supporting members can be attached to or removed from the main frame when the bumper or the trunk rack are attached thereto. This form of supporting means is rugged, the forces emanating therefrom are spread over a large area of the main frame to eliminate localized stresses therein, and it is readily assembled with or removed from the vehicle.

Although the invention has been described in connection with specific embodiments, the principles involved are susceptible of numerous other applications which will readily occur to persons skilled in the art. The invention is therefore to be limited only as indicated by the scope of the appended claims.

What I claim is:

1. An integral bumper supporting member comprising a cylindrical central shank having a peripheral bearing flange extending radially therefrom intermediate its ends, a supporting and anchoring leg extending in an axial direction from one end of the shank, and a body extending in an axial direction from the other end of the shank, said body having a bumper receiving recess in its free end face.

2. In a motor vehicle having a body panel, the combination of a main frame having a side sill and a perforated end sill within a zone defined by the panel, a bumper supporting member extending through the panel and the end sill, removable means securing the end of the member extending through the end sill to the side sill, and an angular bracket secured to the bottom of the side sill and the outer face of the end sill, said bracket having a bearing portion in which the supporting member is mounted, said bumper supporting member being movable axially to or from assembled relation when unsecured.

3. In a motor vehicle having a body panel with an opening therethrough, the combination of a main frame having an opening in the end sill in alignment with the panel opening, an integral bumper supporting member projecting through said openings, and detachable means securing the member to the frame, said openings being of sufficient size to allow insertion and removal of the supporting member therethrough when unfastened from the frame.

4. In a motor vehicle, the combination of a frame having a side sill and an end cross sill, said cross sill having an opening therethrough at the end of the side sill, an angular bracket having a vertically extending bifurcated bearing portion fixed to the outer face of the end sill with the bearing aligning with the opening and a bottom portion fixed beneath the frame, a bumper supporting member mounted and supported by the bracket bearing portion, said member having a radial flange in close proximity to the bearing portion of the bracket and an end extending through the opening in the cross sill, detachable means securing the end of said member to the side sill, and means for contracting the bifurcated bearing portion of said bracket closely about the member.

5. In a motor vehicle, the combination with a pair of spaced longitudinally extending frame members and a transversely extending frame member fixed to said longitudinally extending frame members, of a pair of supports disposed longitudinally of the longitudinally extending frame members, bearing means for each of said support members having a clamping portion embracing the same, means securing said bearing members to the associated longitudinally extending frame member and to the transversely extending frame member, and detachable means securing said support members to the associated longitudinally extending frame members.

JAMES R. FERGUSON.